US008746846B2

(12) United States Patent
Arakawa

(10) Patent No.: US 8,746,846 B2
(45) Date of Patent: Jun. 10, 2014

(54) NOZZLE PLATE, DISCHARGE HEAD, METHOD FOR PRODUCING THE NOZZLE PLATE, METHOD FOR PRODUCING THE DISCHARGE HEAD, AND DISCHARGE DEVICE

(75) Inventor: Katsuji Arakawa, Chino (JP)

(73) Assignee: Seiko Epson Corporation (JP)

( * ) Notice: Subject to any disclaimer, the term of this patent is extended or adjusted under 35 U.S.C. 154(b) by 72 days.

(21) Appl. No.: 12/963,119

(22) Filed: Dec. 8, 2010

(65) Prior Publication Data

US 2011/0134188 A1 Jun. 9, 2011

(30) Foreign Application Priority Data

Dec. 9, 2009 (JP) ................................. 2009-279195

(51) Int. Cl.
*B41J 2/135* (2006.01)
*B32B 38/10* (2006.01)
*B32B 38/00* (2006.01)

(52) U.S. Cl.
USPC ............... 347/45; 156/247; 156/153; 216/33; 216/41

(58) Field of Classification Search
USPC ........... 347/45; 156/153, 247; 216/33, 36, 41, 216/43
See application file for complete search history.

(56) References Cited

U.S. PATENT DOCUMENTS

| | | | |
|---|---|---|---|
| 6,375,858 | B1 | 4/2002 | Makigaki et al. |
| 6,863,375 | B2 | 3/2005 | Makigaki et al. |
| 7,536,785 | B2 | 5/2009 | Arakawa et al. |
| 2006/0118512 | A1 | 6/2006 | Arakawa et al. |
| 2008/0211870 | A1 | 9/2008 | Owaki et al. |

FOREIGN PATENT DOCUMENTS

| | | |
|---|---|---|
| CN | 101254696 | 9/2008 |
| JP | 09-057981 | 3/1997 |
| JP | 10-034920 | 2/1998 |
| JP | 11-028820 | 2/1999 |
| JP | 2006-159661 | 6/2006 |
| JP | 2006-327025 | 12/2006 |
| JP | 2007-038570 | 2/2007 |
| JP | 2008-221653 A | 9/2008 |

*Primary Examiner* — Kevin S Wood
(74) *Attorney, Agent, or Firm* — Harness, Dickey & Pierce, P.L.C.

(57) ABSTRACT

A nozzle plate includes: a nozzle plate main body made of metal, the nozzle plate main body having nozzle rows formed of nozzles arranged in parallel and penetrating the nozzle plate main body in a thickness direction, wherein at the outer edge of the nozzles on a droplet discharge surface of the nozzle plate main body, a water-repellent film is provided, and primer treatment is performed on at least part of the periphery of the droplet discharge surface of the nozzle plate main body, the periphery outside the water-repellent film.

6 Claims, 11 Drawing Sheets

NOZZLE PLATE, DISCHARGE HEAD, METHOD FOR PRODUCING THE NOZZLE PLATE, METHOD FOR PRODUCING THE DISCHARGE HEAD, AND DISCHARGE DEVICE

BACKGROUND

1. Technical Field

The present invention relates to a nozzle plate, a discharge head, a method for producing the nozzle plate, a method for producing the discharge head, and a discharge device.

2. Related Art

As a droplet discharge head for discharging a droplet, an ink-jet head incorporated into an ink-jet head recording apparatus, for example, has been known. The ink-jet head generally includes a nozzle plate in which a plurality of nozzle holes for discharging ink drops are formed and a cavity plate bonded to the nozzle plate and having ink channels formed therein, the ink channels such as discharge chambers and reservoirs which are communicated with the nozzle holes between the cavity plate and the nozzle plate, and is configured to discharge an ink drop through a selected nozzle hole by applying pressure to the discharge chamber by a drive part. As driving means, there are a system using electrostatic force, a piezoelectric system based on a piezoelectric element, a bubble jet® system using a heater element, and the like.

In recent years, the demand for an ink-jet head with high print quality and high image quality has become stronger, and, to realize such an ink-jet head, there has been a growing demand for a denser ink-jet head and an increase in discharge performance. It is under this background that various efforts and suggestions have been made for a nozzle section of the ink-jet head.

To improve the ink discharge characteristic of the ink-jet head, it is desirable to adjust the channel resistance of the nozzle section and adjust the thickness of the substrate so as to provide an optimum nozzle length. When such a nozzle plate is produced, as shown in JP-A-11-28820 (Patent Document 1), for example, a method has been adopted by which a first concave portion (a concave portion which becomes a discharge port of the nozzle hole) and a second concave portion (a concave portion which becomes a feed port of the nozzle hole) for forming the nozzle section, the first concave portion and the second concave portion having different inside diameters, are formed in two stages by performing anisotropic dry etching using ICP (inductively coupled plasma) discharge from one surface of the silicon substrate, and then the length of the nozzle is adjusted by performing anisotropic wet etching on a part from the opposite surface (see, for example, Patent Document 1).

On the other hand, as shown in JP-A-9-57981 (Patent Document 2), for example, there is a method by which a discharge port and a feed port of the nozzle hole are formed by polishing a silicon substrate to an intended thickness in advance and then performing dry etching on both surfaces of the silicon substrate (see, for example, Patent Document 2).

However, as in Patent Document 1, when the discharge surface in which the nozzle hole opens is the bottom of the concave portion formed deeply one step down from the substrate front surface, a curved flight of an ink drop occurs, or, when paper powder, ink, or the like, which clogs the nozzle holes adheres to the bottom of the concave portion which is the discharge surface, it is difficult to perform wiping for wiping the bottom of the concave portion clean with a rubber piece or a felt piece to remove the paper powder, the ink, or the like.

Moreover, with the production method described in Patent Document 2, the thickness of the silicon nozzle plate substrate has to be made thinner as the ink-jet head becomes denser; however, such a silicon substrate is apt to splinter during a production process and becomes expensive. Furthermore, when dry etching is performed, cooling is performed from the back surface of the substrate by using He gas or the like to stabilize the work shape. In this case, it becomes sometimes impossible to perform etching due to a leakage of the He gas at the time of formation of the nozzle hole. It is for this reason that, as described in JP-A-2006-159661 (Patent Document 3), a method for producing a nozzle plate has been adopted by which concave portions which become nozzle holes are formed in a silicon substrate in advance, the substrate is bonded by using, for example, a double-faced sheet having a peel layer on one side of the bonding layer, the peel layer whose adhesion power is easily weakened by a stimulus such as ultraviolet radiation or heat, and then the nozzle holes (the concave portions) are formed by working the silicon substrate into a thin plate by grinding, CMP, or the like. In addition, an ink-repellent film is formed on the discharge surface, and primer treatment is performed on the adhesive surface to enhance the strength of adhesion to the cavity.

However, in this method for producing a nozzle plate, since the whole surface of the discharge surface is coated with the ink-repellent film, a head formation member (a cover head) protecting the periphery of the ink-jet head is bonded to the discharge surface with low bonding strength, reducing the reliability of the head.

SUMMARY

An advantage of some aspects of the invention is to solve at least part of the problems described above, and the invention can be embodied as embodiments or application examples described below.

Application Example 1

This application example is directed to a nozzle plate including: a nozzle plate main body made of metal, the nozzle plate main body having nozzle rows formed of nozzles arranged in parallel and penetrating the nozzle plate main body in a thickness direction, wherein, at the outer edge of the nozzles on a droplet discharge surface of the nozzle plate main body, a water-repellent film is provided, and primer treatment is performed on at least part of the periphery of the droplet discharge surface of the nozzle plate main body, the periphery outside the water-repellent film.

According to this application example, an ink-repellent film on the chip periphery on the ink discharge surface is partially removed by using a tape mask, and in addition primer treatment is performed. By performing primer treatment on the chip periphery on the discharge surface of the nozzle plate, adhesion strength with which a cover head is attached is enhanced, and the reliability of the head is increased.

Application Example 2

In the nozzle plate described above, the region subjected to primer treatment may be located at both ends of the nozzle rows.

According to this application example, it is possible to perform positioning of the other plate and a plurality of nozzle rows with a higher degree of accuracy.

Application Example 3

In the nozzle plate described above, the region subjected to primer treatment may be a region on the droplet discharge surface corresponding to an adhesive part on an adhesive surface in which the nozzle plate main body is bonded to another plate.

According to this application example, it is possible to press the adhesive part reliably at the time of bonding, making it possible to realize good bonding with the other plate more reliably.

Application Example 4

This application example is directed to a method for producing a nozzle plate, including: forming, on one surface of a work substrate, a first concave portion which becomes a discharge port and a second concave portion which becomes a feed port, the discharge port and the feed port of a nozzle for discharging a droplet; bonding a support substrate to the one surface of the work substrate; making the work substrate thinner from the other surface thereof so that the work substrate has a necessary thickness; forming a water-repellent film on the other surface of the work substrate and in the first and second concave portions and then pasting an island-shaped tape on the other surface of the work substrate; removing the water-repellent film on the periphery of the other surface of the work substrate; peeling off the support substrate from the work substrate; performing primer treatment (enhancing adhesion of an adhesive) on the periphery of the other surface of the work substrate; and peeling off the island-shaped tape.

According to this application example, by protecting the discharge surface by using a protective film cut into the shape of an island, it is possible to remove only the ink-repellent film on the chip periphery and perform primer treatment on that part in parallel with the bonded surface.

Application Example 5

In the above-described method for producing a nozzle plate, when the work substrate is made thinner, the work substrate may be polished by using a back grinder, a polisher, or a CMP apparatus.

According to this application example, it is possible to finish the front surface (the discharge surface) of the work substrate with a high degree of accuracy.

Application Example 6

In the above-described method for producing a nozzle plate, as the support substrate, optically transparent material may be used.

According to this application example, it is possible to apply light such as laser light to a peel layer from the back surface of the support substrate, making it possible to peel off the support substrate from the work substrate easily.

Application Example 7

In the above-described method for producing a nozzle plate, the first and second concave portions may be formed by anisotropic dry etching performed by ICP discharge.

According to this application example, it is possible to provide the first and second concave portions formed at a high degree of accuracy.

Application Example 8

In the above-described method for producing a nozzle plate, anisotropic dry etching may be performed by using $C_4F_8$ and $SF_6$ as etching gas.

According to this application example, since $C_4F_8$ protects the side faces of the first and second concave portions so that the side faces of these concave portions are not etched and $SF_6$ promotes etching which is performed perpendicularly on these concave portions, it is possible to form these concave portions perpendicularly relative to the substrate surface with a high degree of accuracy.

Application Example 9

This application example is directed to a discharge head including: a plurality of head main bodies each having the nozzle plate described in any one of the above-mentioned application examples, the nozzle plate having nozzle rows formed of nozzles arranged in parallel; a head case fixed to the sides of the head main bodies, the sides where supply ports of the head main bodies are provided; and a cover head covering the head main bodies, the cover head defining exposure opening sections from which the nozzles are exposed and having a bonded section bonded to at least both ends of the nozzle rows on the discharge surface of the nozzle plate.

According to this application example, the discharge head includes the nozzle plate described in any one of the above-mentioned application examples, and it is possible to increase the reliability of the head.

Application Example 10

In the above-described discharge head, between the head main bodies and the cover head, a fixing plate which defines exposure opening sections from which the nozzles are exposed and has a bonded section bonded to at least both ends of the nozzle rows on the discharge surface may be provided, and the head main bodies may be positioned and fixed to the common fixing plate by bonding the discharge surface of the head main body and the fixing plate.

According to this application example, it is possible to position the fixing plate and the head main bodies and bond them together by performing relative positioning of the nozzle rows easily and with a high degree of accuracy by the fixing plate.

Application Example 11

This application example is directed to a method for producing a discharge head, the method in which a discharge head is produced by using the method for producing a nozzle plate, the method described in any one of the above-mentioned application examples.

According to this application example, the method for producing a discharge head is a method for producing a discharge head by using the method for producing a nozzle plate, the method described in any one of the above-mentioned application examples, and can produce a discharge head that can increase the reliability of the head.

Application Example 12

This application example is directed to a discharge device into which the discharge head described in the above-mentioned application examples is incorporated.

According to this application example, the discharge device incorporates the discharge head described in the above-mentioned application examples, and it is possible to obtain the discharge device that can increase the reliability of the head.

BRIEF DESCRIPTION OF THE DRAWINGS

The invention will be described with reference to the accompanying drawings, wherein like numbers reference like elements.

DESCRIPTION OF EXEMPLARY EMBODIMENTS

The invention will be described below in detail based on an embodiment. It is to be understood that the embodiment is not limited to the structure and shape shown in the following drawings and can also be applied to a discharge head and a discharge device which discharge a droplet by another drive system.

Figure 1:
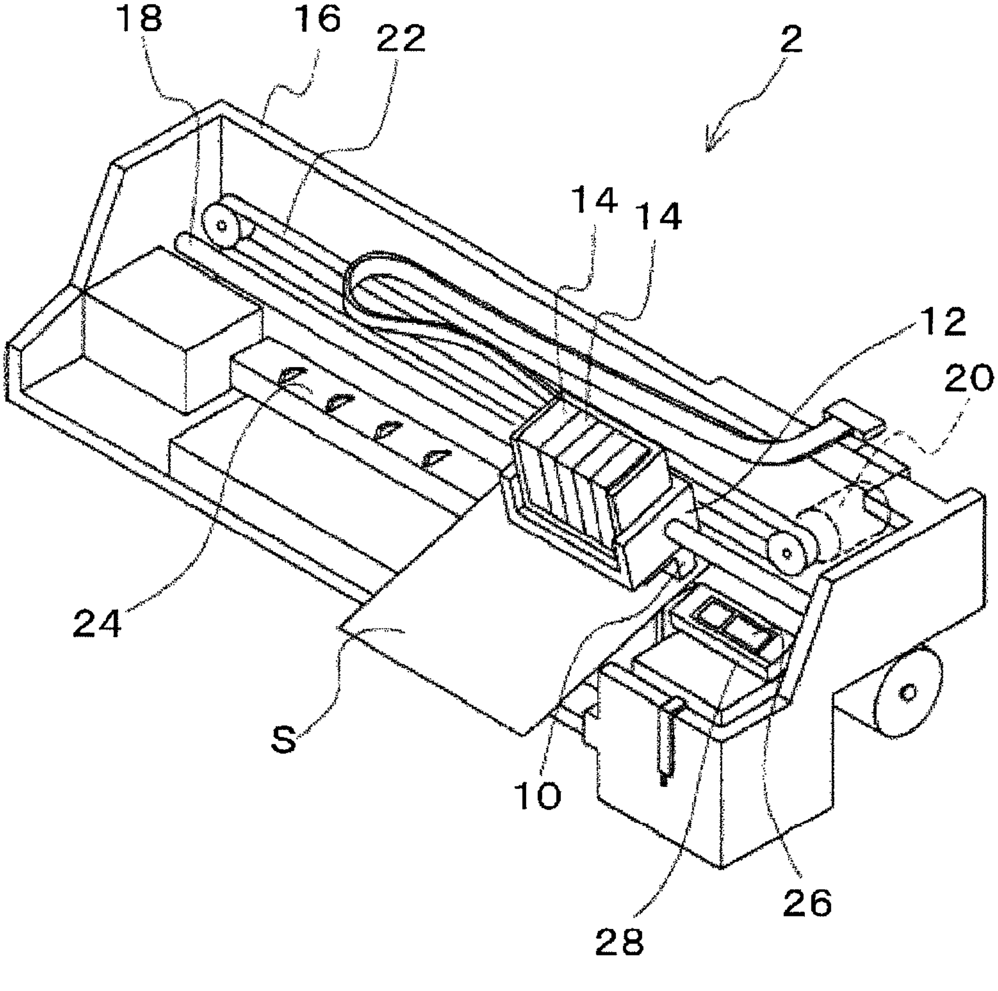
FIG. 1 is a schematic perspective view of an ink-jet recording apparatus which is an example of a liquid discharge device as a discharge device according to an embodiment.

FIG. 1 is a schematic perspective view of an ink-jet recording apparatus which is an example of a liquid discharge device as a discharge device according to the embodiment. As shown in FIG. 1, in an ink-jet recording apparatus 2 according to the embodiment, an ink-jet head (hereinafter also referred to as a droplet discharge head) 10 which is an example of a liquid discharge head discharging an ink drop as a discharge head is fixed to a carriage 12, and ink cartridges 14 which are liquid storage means, the ink cartridges 14 in which inks of different colors such as black (B), light black (LB), cyan (C), magenta (M), and yellow (Y) are stored, are detachably fixed to the droplet discharge head 10.

The carriage 12 fitted with the droplet discharge head 10 is attached to a carriage shaft 18 so as to be movable in the axial direction, the carriage shaft 18 fastened to an apparatus main body 16. The carriage 12 is moved along the carriage shaft 18 when the driving force of a drive motor 20 is transferred to the carriage 12 via a plurality of unillustrated gears and a timing belt 22. On the other hand, the apparatus main body 16 is provided with a platen 24 along the carriage shaft 18, and a recording medium S such as paper fed by an unillustrated paper feeder or the like is conveyed on the platen 24.

Moreover, in a position corresponding to a home position of the carriage 12, that is, near one end of the carriage shaft 18, a capping device 28 having a cap member 26 which seals a face of the droplet discharge head 10, the face on which a nozzle is formed, is provided. By sealing the face on which the nozzle is formed with the cap member 26, drying of the ink is prevented. In addition, the cap member 26 also functions as an ink receiver at the time of flashing operation.

Here, the droplet discharge head 10 according to the embodiment will be described. Incidentally, FIG. 2 is an exploded perspective view of the ink-jet head which is an example of the liquid discharge head according to the embodiment.

Figure 2:
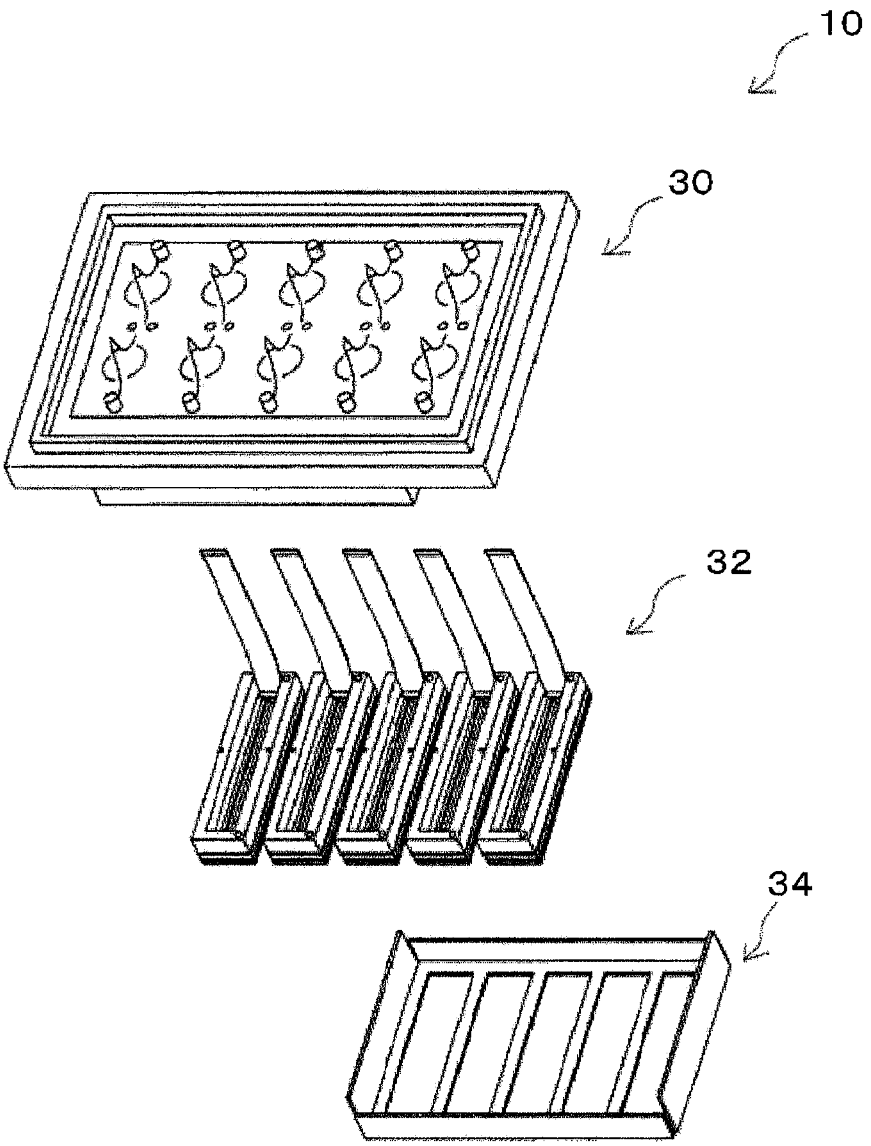
FIG. 2 is an exploded perspective view of an ink-jet head which is an example of a liquid discharge head according to the embodiment.

As shown in FIG. 2, the droplet discharge head 10 is provided with a supply member 30 functioning as a head case such as a cartridge case to which the ink cartridge 14, which is liquid storage means, is fixed, a head main body 32 fixed to the face of the supply member 30 opposite from the ink cartridge 14, and a cover head 34 provided on the liquid discharge surface side of the head main body 32.

Incidentally, between the head main body 32 and the cover head 34, a fixing plate (not shown) which defines an exposure opening section in which the opening of the nozzle hole 36 is exposed and has a bonded section bonded to at least both ends of the rows of the nozzle holes 36 on an ink discharge surface 78 may be provided, and a plurality of head main bodies 32 may be positioned and fixed to the common fixing plate by bonding the ink discharge surface 78 of the head main body 32 and the fixing plate.

Hereinafter, an embodiment of the head main body 32 provided with a nozzle plate (a nozzle substrate) according to the embodiment will be described based on the drawings.

Figure 3:
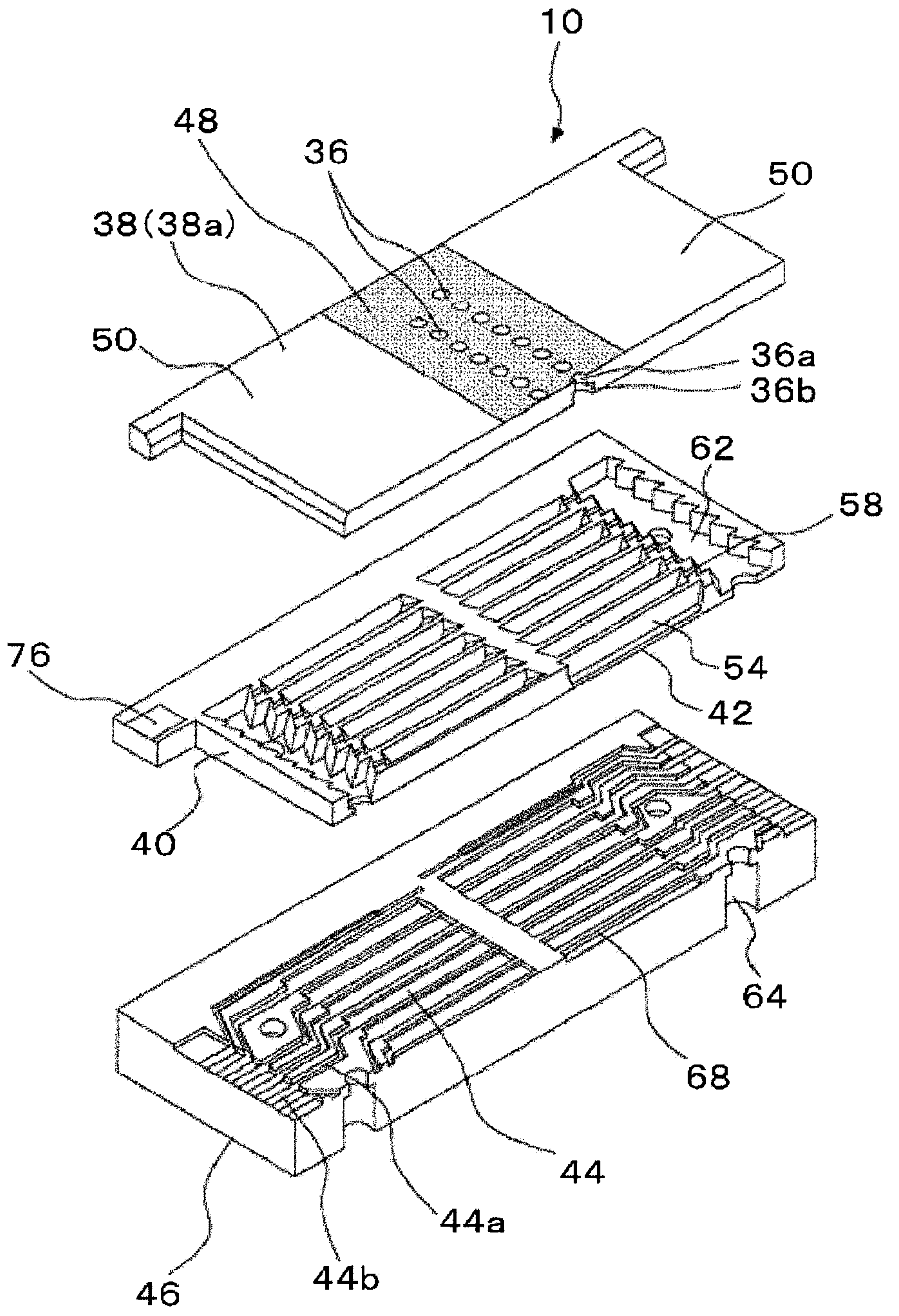
FIG. 3 is an exploded perspective view showing a schematic structure of the ink-jet head according to the embodiment.
Figure 4:
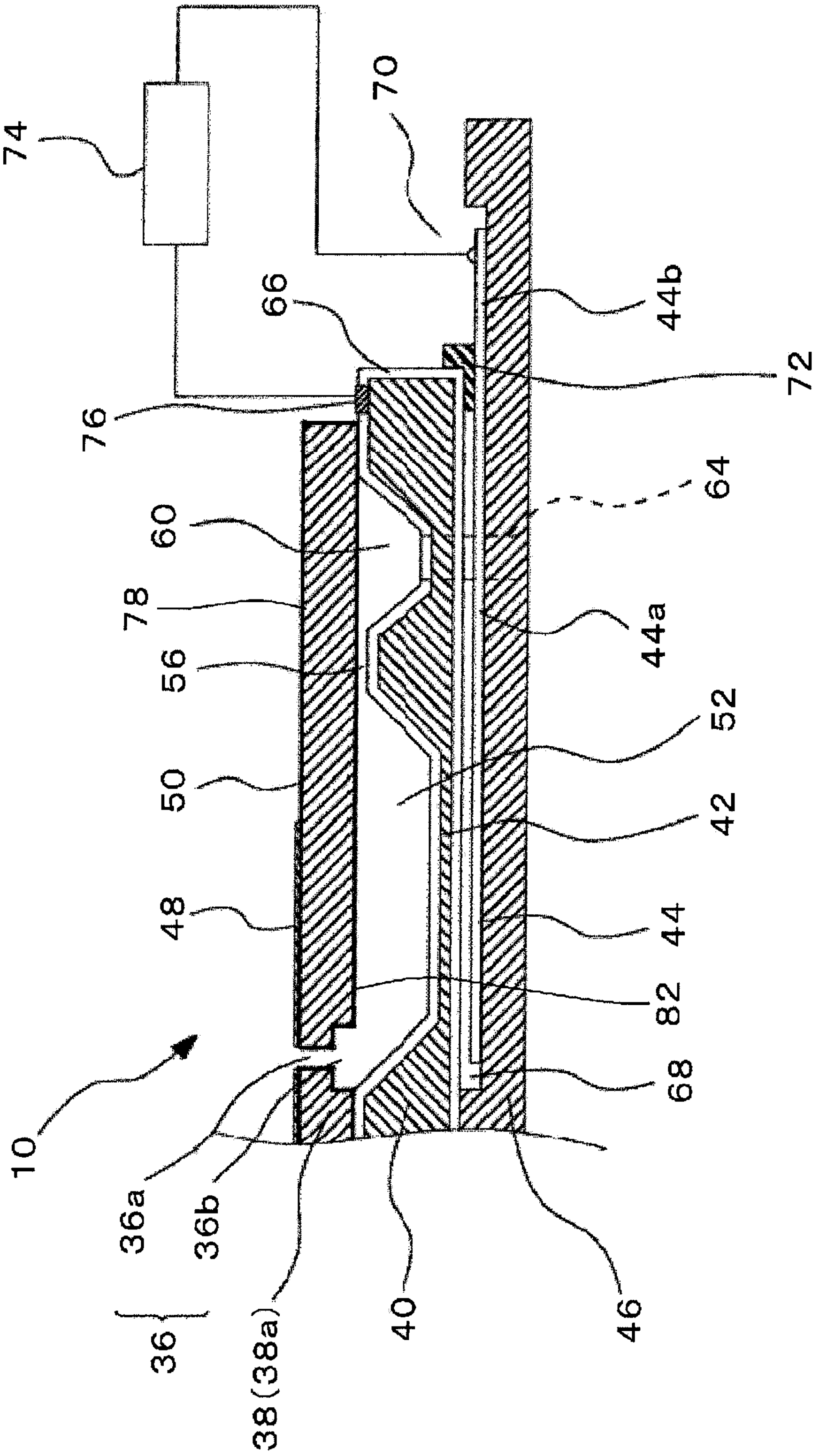
FIG. 4 is a sectional view of the ink-jet head, the sectional view showing a schematic structure of a right half of FIG. 3.
Figure 5:
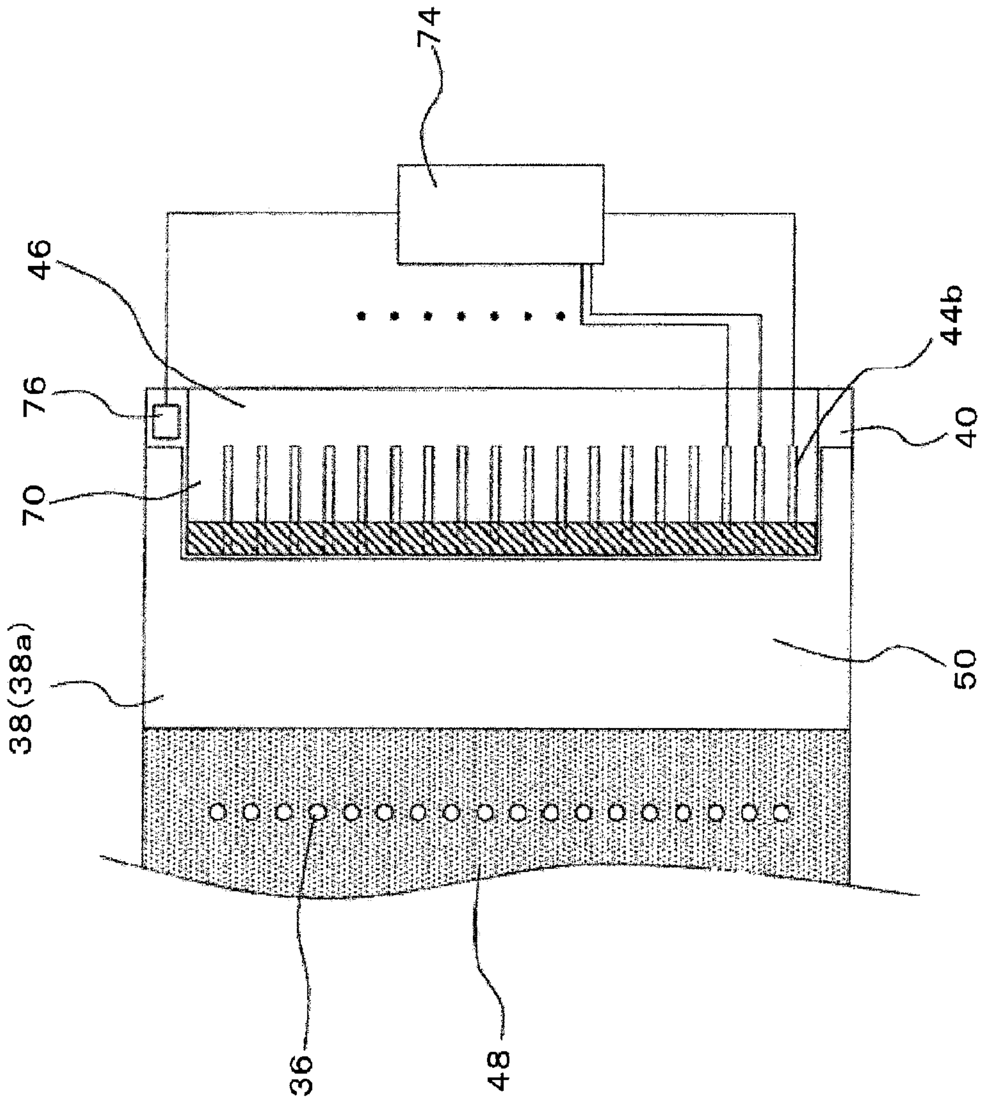
FIG. 5 is a top view of the ink-jet head of FIG. 4.

FIG. 3 is an exploded perspective view showing a schematic structure of the ink-jet head according to the embodiment, and part of the ink-jet head is shown in section. FIG. 4 is a sectional view of the ink-jet head, the sectional view showing a schematic structure of a right half of FIG. 3. FIG. 5 is a top view of the ink-jet head of FIG. 4. Incidentally, FIGS. 3 and 4 show the ink-jet head which is turned upside down with respect to the usual manner of use.

As shown in FIGS. 3 and 4, the head main body 32 of this embodiment is formed by bonding a nozzle substrate 38 having a nozzle plate main body 38*a* in which the nozzle holes 36 functioning as a plurality of nozzles are provided with a predetermined pitch, a cavity substrate 40 in which ink feed channels are provided individually for the nozzle holes 36, and an electrode substrate 46 in which individual electrodes 44 are disposed so as to face vibration plates 42 of the cavity substrate 40.

The nozzle substrate 38 is formed of a silicon single crystal substrate (hereinafter also referred to simply as a silicon substrate) which is made thinner to have a necessary thickness (for example, which is made thinner from 280 μm to about 60 μm) by a production method, which will be described later. Moreover, an ink-repellent film 48 functioning as a water-repellent film as an example of a liquid-repellent film is formed all over the front surface of the nozzle substrate 38 or part thereof, that is, in a discharge surface area including all the nozzle holes 36. The ink-repellent film 48 is formed on an ink-resistant protective film 50 formed of a silicon dioxide film ($SiO_2$ film), for example. Incidentally, the "discharge surface area" is an area in which wiping operation of the ink-jet head is performed as described earlier. Furthermore, primer treatment is performed (not shown) on the periphery of the ink discharge surface 78 which is a surface of the nozzle substrate 38, the surface from which droplets are discharged (hereinafter referred to as a droplet discharge surface).

The nozzle hole 36 for discharging an ink drop is formed of nozzle hole portions having a two-step cylindrical shape, the nozzle hole portions having the same central axis line but different diameters, for example, that is, a first nozzle hole 36*a* as a first nozzle section with a smaller diameter and a second nozzle hole 36*b* as a second nozzle section having a diameter greater than that of the first nozzle hole 36*a*. The first nozzle hole 36*a* and the second nozzle hole 36*b* are provided coaxially and perpendicularly relative to the substrate surface. The opening of the first nozzle hole 36*a* is formed in the ink discharge surface 78 (a surface opposite to a bonded surface 82 at which the nozzle substrate 38 and the cavity substrate 40 are bonded) of the nozzle substrate 38, and the opening of the second nozzle hole 36*b* is formed in the bonded surface 82 (a surface which is bonded to the cavity substrate 40) of the nozzle substrate 38.

As described above, by forming the nozzle hole 36 so as to have a two-step structure formed of the first nozzle hole 36*a* and the second nozzle hole 36*b* having a diameter greater than that of the first nozzle hole 36*a*, an ink drop can be discharged in the central axis direction of the nozzle hole 36, making it possible to provide a stable ink discharge characteristic. That is, the ink drop is flown in a constant direction, and splattering of ink drop is prevented, whereby it is possible to reduce variations in the discharge amount of ink drop. Moreover, it is possible to increase the nozzle density.

The cavity substrate 40 is formed of a silicon single crystal substrate (which is also referred to simply as a silicon substrate) having a thickness of 525 μm and (110) plane orientation, for example. Anisotropic wet etching is performed on the silicon substrate, whereby a concave portion 54 which becomes a discharge chamber 52 of an ink channel, a concave portion 58 which becomes an orifice 56, and a concave portion 62 which becomes a reservoir 60 are formed. A plurality of concave portions 54 are formed independently in positions corresponding to the nozzle holes 36. Therefore, when the nozzle substrate 38 and the cavity substrate 40 are bonded together, each concave portion 54 forms the discharge chamber 52, communicates with the nozzle hole 36, and also communicates with the orifice 56 which is an ink supply port. In addition, the bottom wall of the discharge chamber 52 (the concave portion 54) functions as a vibration plate 42.

The concave portion 58 forms the thin groove-like orifice 56, and the concave portion 54 (the discharge chamber 52) and the concave portion 62 (the reservoir 60) communicate with each other via the concave portion 58.

The concave portion 62 stores liquid material such as ink, and forms the common reservoir (common ink chamber) 60 of the discharge chambers 52. The reservoir 60 (the concave portion 62) communicates with all the discharge chambers 52 via the orifice 56. Incidentally, the orifice 56 (the concave portion 58) can be provided on the back surface (a face at which the nozzle substrate 38 is bonded to the cavity substrate 40) of the nozzle substrate 38. Moreover, a hole penetrating the electrode substrate 46, which will be described later, is formed in the bottom of the reservoir 60, and ink is supplied from an unillustrated ink cartridge through this ink supply hole 64.

Furthermore, the reason why the silicon single crystal substrate having (110) plane orientation is used as the cavity substrate 40 as mentioned earlier is as follows. By performing anisotropic wet etching on the silicon substrate, it is possible to perform etching in such a way that the side faces of the concave portion or groove become perpendicular to the upper or lower surface of the silicon substrate. This makes it possible to realize a denser ink-jet head.

Moreover, an insulating film 66 which is formed of a $SiO_2$ or TEOS (tetraethylorthosilicate: tetraethoxysilane, ethyl silicate) film and has a film thickness of 0.1 μm is formed all over the cavity substrate 40 or on at least a surface thereof facing the electrode substrate 46 by thermal oxidation or plasma CVD (chemical vapor deposition). The insulating film 66 is provided to prevent a dielectric breakdown or short circuit which may occur when the ink-jet head is driven.

The electrode substrate 46 is formed of a glass substrate having a thickness of about 1 mm, for example. In particular, borosilicate base heat-resistant hard glass having a thermal expansion coefficient close to that of the silicon substrate which is the cavity substrate 40 is suitably used. The reason is as follows. When the electrode substrate 46 and the cavity substrate 40 are anodically-bonded, since the two substrates have similar thermal expansion coefficients, it is possible to reduce the stress which is produced between the electrode substrate 46 and the cavity substrate 40. This makes it possible to bond the electrode substrate 46 and the cavity substrate 40 firmly without causing a problem such as peeling. Incidentally, a borosilicate base glass substrate can also be used as the nozzle substrate 38 for the same reason.

The electrode substrate 46 is provided with concave portions 68 in positions facing the vibration plates 42 of the cavity substrate 40. The concave portions 68 are formed by etching so as to have a depth of about 0.3 μm. Inside each concave portion 68, the individual electrode 44 generally formed of ITO (indium tin oxide) is formed by sputtering so as to have a thickness of 0.1 μm, for example. Therefore, a gap formed between the vibration plate 42 and the individual electrode 44 is determined by the depth of the concave portion 68, the thickness of the individual electrode 44, and the thickness of the insulating film 66 covering the vibration plate 42. This gap has a great influence on the discharge characteristic of the ink-jet head. Here, the material of the individual electrode 44 is not limited to ITO, and metal such as chromium may be used. However, ITO is generally used because ITO is transparent and thereby makes it easy to check whether an electrical current has been discharged or not.

The individual electrode 44 has a lead section 44*a* and a terminal section 44*b* connected to a flexible wiring substrate (not shown). As shown in FIGS. 3 to 5, the terminal sections 44*b* are exposed in a section 70 in which the electrode is drawn, the section in which the end part of the cavity substrate 40 is opened for wiring.

As described above, by bonding the nozzle substrate 38, the cavity substrate 40, and the electrode substrate 46 together as shown in FIG. 4, the head main body 32 of the ink-jet head 10 is fabricated. That is, the cavity substrate 40 and the electrode substrate 46 are anodically-bonded, and the nozzle substrate 38 is bonded to the upper surface (the upper surface in FIG. 4) of the cavity substrate 40 by adhesive bonding or the like. Furthermore, the open end of the interelectrode gap formed between the vibration plates 42 and the individual electrodes 44 is sealed with seal material 72 formed of resin such as epoxy. This makes it possible to prevent moisture or dust from entering the interelectrode gap and thereby maintain high reliability of the ink-jet head 10.

Finally, as simplified and shown in FIGS. 4 and 5, a drive control circuit 74 such as an IC driver is connected to the terminal section 44*b* of each individual electrode 44 and a common electrode 76 provided on the cavity substrate 40 via the flexible wiring substrate (not shown).

In this way, the head main body 32 of the ink-jet head 10 is completed.

Figure 6:
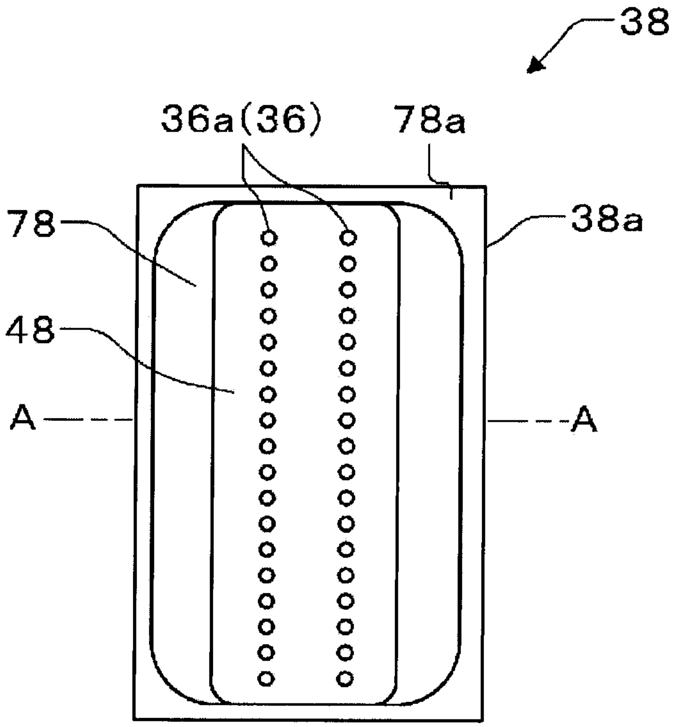
FIG. 6 is a top view of a nozzle substrate according to the embodiment, the nozzle substrate viewed from the ink discharge surface side.

FIG. 6 is a top view of the nozzle substrate 38 according to the embodiment, the nozzle substrate 38 viewed from the ink discharge surface 78 side. As shown in FIG. 6, a plurality of first nozzle holes 36*a* are formed on the ink discharge surface 78 of the nozzle substrate 38. Incidentally, the second nozzle holes 36*b* are formed on the other side of the plane of FIG. 6 in positions corresponding to the first nozzle holes 36*a*. Moreover, the discharge chambers 52 of the cavity substrate 40 are formed, one for each first nozzle hole 36*a* (nozzle hole 36), and each discharge chamber 52 is elongated in the direction of the line A-A of FIG. 6.

The nozzle substrate 38 has a primer treatment region 78*a* on the periphery of the ink discharge surface 78, the primer treatment region 78*a* on which primer treatment is performed. The primer treatment region 78*a* may be the entire surface or part of the periphery of the ink discharge surface 78. The primer treatment region 78*a* may be the periphery of the ink discharge surface 78 of the nozzle substrate 38 outside the ink-repellent film 48, the periphery on at least both ends of the rows of nozzle holes 36. The primer treatment region 78*a* may be an area on the ink discharge surface 78, the area corresponding to an adhesive part on an adhesive surface in which the nozzle substrate 38 is bonded to another plate.

Next, the operation of the ink-jet head 10 structured as described above will be described. The ink-jet head 10 is driven by applying a pulse to the electrodes of the cavity substrate 40 and the electrode substrate 46 by the drive control circuit 74. The drive control circuit 74 is an oscillator circuit performing control so as to supply electric charges to the individual electrode 44 and stop the supply thereof. The oscillator circuit oscillates at 24 kHz, for example, and supplies electric charges to the individual electrode 44 by applying a pulse potential of 0 V and 30 V, for example. When the oscillator circuit operates and supplies electric charges to the individual electrode 44 and thereby makes the individual electrode 44 become positively charged, the vibration plate 42 is negatively charged, and an electrostatic force (a coulomb force) is produced between the individual electrode 44 and the vibration plate 42. Therefore, the vibration plate 42 is drawn to the individual electrode 44 and bent (displaced) by the electrostatic force. As a result, the volume of the discharge chamber 52 is increased. Then, when the supply of the electric charges to the individual electrode 44 is stopped, the vibration plate 42 is restored to a normal state by the elastic force thereof, and, since the volume of the discharge chamber 52 is sharply reduced at that time, part of the ink in the discharge chamber 52 is discharged out of the nozzle hole 36 by the pressure caused by the sharp volume reduction. When the vibration plate 42 is then displaced similarly, the discharge chamber 52 is replenished with ink from the reservoir 60 through the orifice 56.

As mentioned above, since the nozzle hole 36 is formed of the cylindrical first nozzle hole 36*a* perpendicular to the front surface (the ink discharge surface 78) of the nozzle substrate 38 and the second nozzle hole 36*b* which is provided coaxially with the first nozzle hole 36*a* and has a diameter greater than that of the first nozzle hole 36*a*, the ink-jet head 10 of this embodiment can discharge an ink drop in a straight line in the central axis direction of the nozzle hole 36, and has an extremely stable discharge characteristic.

Furthermore, since the second nozzle hole 36*b* can be formed so as to have a circular or rectangular cross sectional shape, it is possible to realize a denser ink-jet head 10.

Incidentally, the cross sectional shape of the first nozzle hole 36*a* and the second nozzle hole 36*b* of the nozzle hole 36 is not limited to a particular shape, and the first nozzle hole 36*a* and the second nozzle hole 36*b* are formed so as to have a rectangular cross sectional shape, a circular cross sectional shape, etc. However, a circular cross sectional shape is preferable because it is advantageous in terms of the discharge characteristic and workability.

Hereinafter, a process for forming the nozzle substrate 38 will be described in detail based on FIGS. 7A to 11C. FIGS. 7A to 11C are process diagrams showing a method for producing the nozzle substrate according to the embodiment.

Figure 7A:
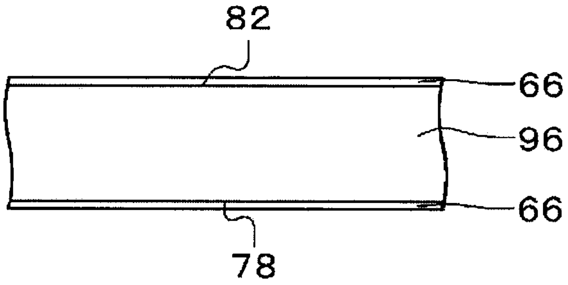
FIGS. 7A to 7E illustrate a process diagram showing a method for producing the nozzle substrate according to the embodiment.

First, as shown in FIG. 7A, a silicon substrate 96 serving as a work substrate having a substrate thickness of 280 μm is prepared, is set in a thermal oxidation system, and thermal oxidation is performed on the substrate at an oxidation temperature of 1075° C. for 4 hours in an atmosphere of a mixture of oxygen and water vapor, whereby a $SiO_2$ film 66 having a film thickness of 1 μm is uniformly formed on the front surface of the Si substrate.

Figure 7B:
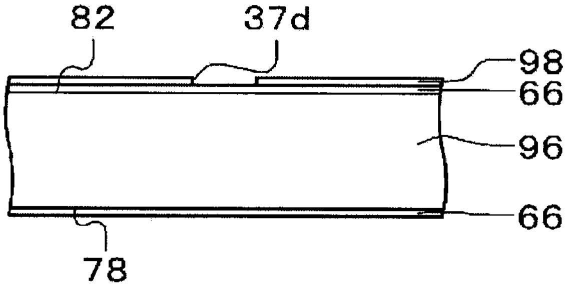

Next, as shown in FIG. 7B, the bonded surface 82 of the silicon substrate 96 is coated with a resist 98, and a portion 37*d* which becomes the second nozzle hole 36*b* is formed on the bonded surface 82 by patterning.

Figure 7C:
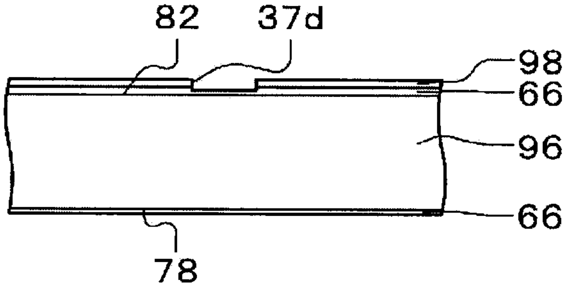

Then, as shown in FIG. 7C, the $SiO_2$ film 66 is made thinner. For example, the $SiO_2$ film 66 is made thinner by performing half-etching thereon by using a buffered hydrofluoric acid solution (hydrofluoric acid solution:ammonium fluoride solution=1:6). At this time, the $SiO_2$ film 66 on the back surface is also etched and is made thinner.

Figure 7D:
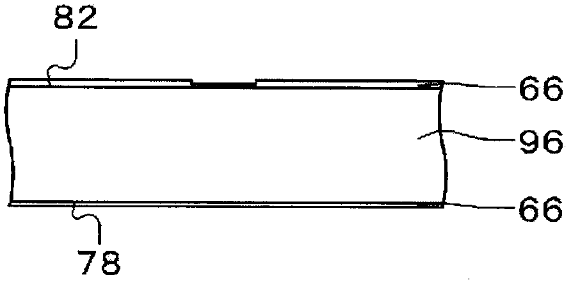

Next, as shown in FIG. 7D, the resist is removed by sulfuric acid treatment or the like.

Figure 7E:
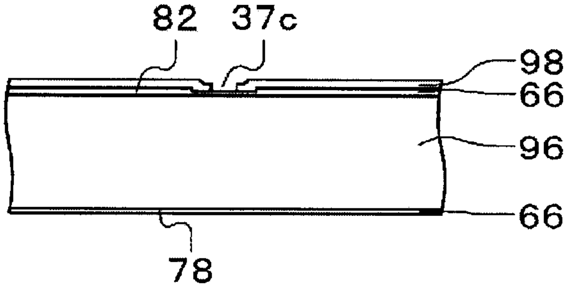

Then, as shown in FIG. 7E, the bonded surface 82 of the silicon substrate 96 is coated again with the resist 98, and a portion 37*c* which becomes the first nozzle hole 36*a* is formed on the bonded surface 82 by patterning.

Figure 8A:
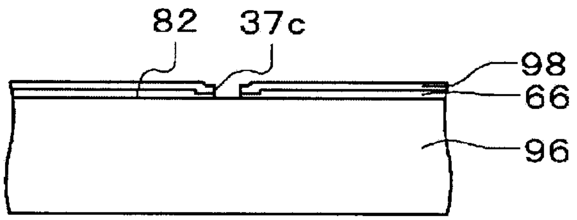
FIGS. 8A to 8E illustrate a process diagram showing the method for producing the nozzle substrate according to the embodiment.

Next, as shown in FIG. 8A, an opening is formed in the $SiO_2$ film 66. For example, an opening is formed in the $SiO_2$ film 66 by performing etching thereon by using a buffered hydrofluoric acid solution (hydrofluoric acid solution:ammonium fluoride solution=1:6). At this time, the $SiO_2$ film 66 on the back surface is etched and removed completely.

Figure 8B:
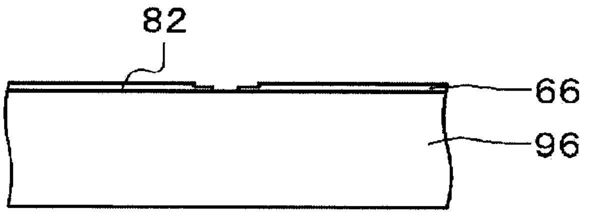

Next, as shown in FIG. 8B, the resist is removed by sulfuric acid treatment or the like.

Figure 8C:
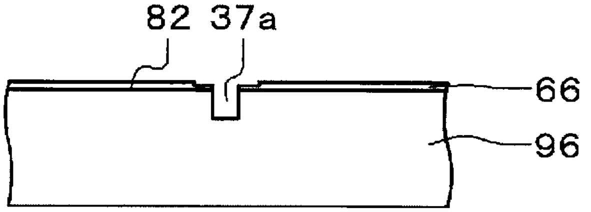

Then, as shown in FIG. 8C, anisotropic dry etching is performed perpendicularly on the opening of the $SiO_2$ film to a depth of 25 μm, for example, by the ICP dry etching equipment, whereby a first concave portion 37*a* which becomes the first nozzle hole 36*a* is formed. As the etching gas used in this case, $C_4F_8$ and $SF_6$, for example, are used, and these etching gases may be used alternately. Here, $C_4F_8$ is used to protect the side faces of the groove to be formed so that the side faces are not etched, and $SF_6$ is used to promote etching which is performed perpendicularly on the Si substrate.

Figure 8D:
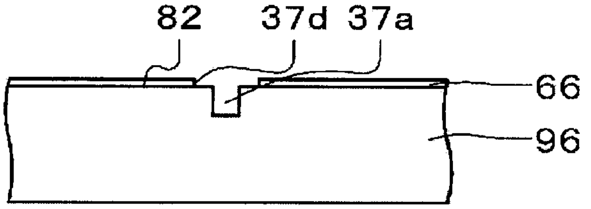

Next, as shown in FIG. 8D, half-etching is performed by using the buffered hydrofluoric acid solution in such a way that only the $SiO_2$ film in the portion 37*d* which becomes the second nozzle hole 36*b* is removed.

Figure 8E:
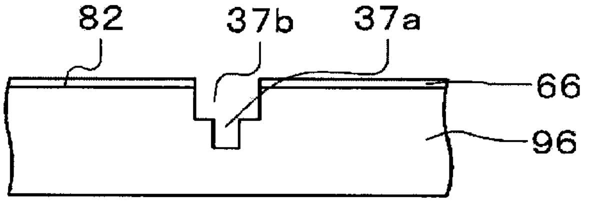

Then, as shown in FIG. 8E, anisotropic dry etching is performed again perpendicularly on the opening of the $SiO_2$ film to a depth of 40 μm, for example, by the ICP dry etching equipment, whereby a second concave portion 37*b* which becomes the second nozzle hole 36*b* is formed.

Figure 9A:
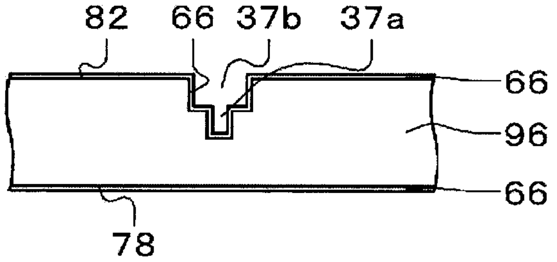
FIGS. 9A to 9E illustrate a process diagram showing the method for producing the nozzle substrate according to the embodiment.

Next, as shown in FIG. 9A, after the $SiO_2$ film remaining on the front surface of the silicon substrate 96 is removed by a hydrofluoric acid solution, the silicon substrate 96 is set in the thermal oxidation system, and thermal oxidation is performed on the substrate at an oxidation temperature of 1000° C. for 2 hours in an atmosphere of oxygen, whereby a $SiO_2$ film 66 having a film thickness of 0.1 μm is uniformly formed on the side and bottom faces of the first concave portion 37*a* and the second concave portion 37*b* formed by the ICP dry etching equipment.

Figure 9B:
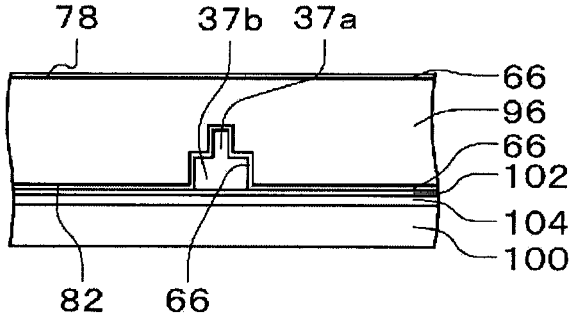

Then, as shown in FIG. 9B, a double-faced tape 104 having a self-peeling layer 102 whose adhesive power is easily reduced by a stimulus such as ultraviolet radiation or heat is attached to a support substrate 100 made of transparent material (such as glass). By placing the surface of the self-peeling layer 102 of the double-faced tape 104 attached to the support substrate 100 and the bonded surface 82 of the silicon substrate 96 face-to-face and bonding the surfaces together in a vacuum, it is possible to achieve good bonding which leaves no air bubble at the bonding interface. An air bubble left at the bonding interface would cause variations in the thickness of the silicon substrate which is made thinner by polishing. As the double-faced tape, a double-faced tape.

Figure 9C:
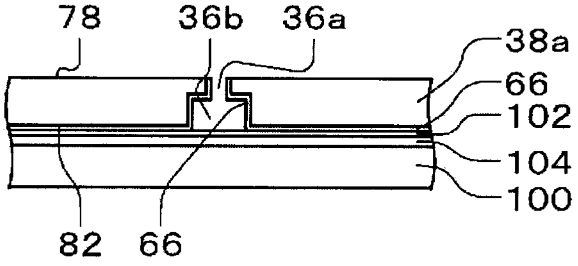

Next, as shown in FIG. 9C, by performing grinding from the ink discharge surface 78 side of the silicon substrate 96 by using a back grinder, the silicon substrate 96 is made thinner to a thickness close to an intended substrate thickness, for example, to a thickness of 71 μm, and the end of the first concave portion 37*a* is opened, whereby the first nozzle hole 36*a* and the second nozzle hole 36*b* are formed. In addition, the nozzle surface is polished by using a polisher or a CMP apparatus so that the substrate has an intended substrate thickness, for example, 65 μm. As a result, the nozzle plate main body 38*a* is formed.

Figure 9D:
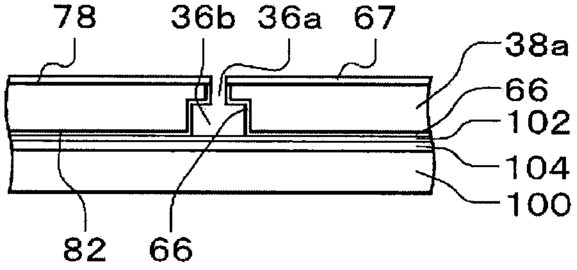

Then, as shown in FIG. 9D, an oxide metal film, such as a $SiO_2$ film 67, which becomes an ink-resistant protective film and a primary coating for an ink-repellent film is formed on the ink discharge surface 78 of the nozzle plate main body 38*a* so as to have a thickness of 0.1 μm by using a sputtering system. Here, it is only necessary to perform the formation of the oxide metal film at a temperature below the temperature (about 100° C.) at which the self-peeling layer 102 is not degraded, and the film formation method is not limited to the sputtering method. As the oxide metal film, a hafnium oxide film, tantalum oxide, titanium oxide, indium tin oxide, and zirconium oxide can also be used. As long as the oxide metal film can be formed at a temperature which does not affect the self-peeling layer and the adhesion to the nozzle plate main body 38*a* can be ensured, the film formation method is not limited to the sputtering method, and may be a method such as CVD.

Figure 9E:
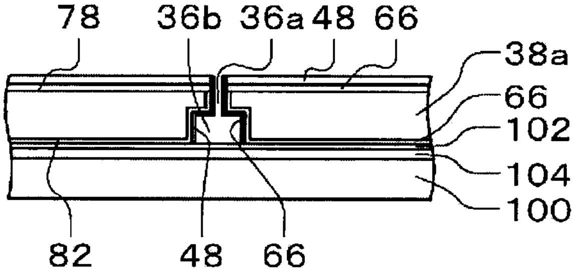

Then, as shown in FIG. 9E, the front surface of the ink discharge surface 78 of the nozzle plate main body 38*a* is made ink-repellent. A film of material including F atoms and having ink repellency is formed by vapor deposition or dipping, whereby the ink-repellent film 48 is formed. At this time, the inner wall of the first nozzle hole 36*a* and the second nozzle hole 36*b* is also made ink-repellent.

Figure 10A:
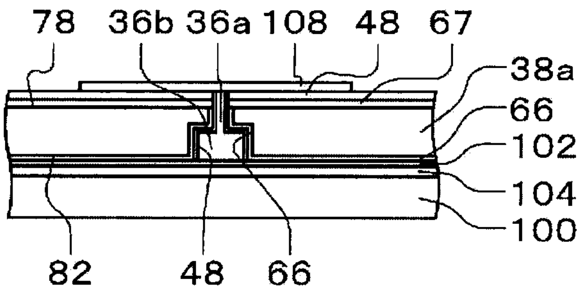
FIGS. 10A to 10D illustrate a process diagram showing the method for producing the nozzle substrate according to the embodiment.

Next, as shown in FIG. 10A, a protective film 108 which is an island-shaped tape and is cut into the shape of an island so that a predetermined area around the row of nozzle holes can be masked and protected is pasted to the ink discharge surface 78. Here, a protective film is used.

Figure 10B:
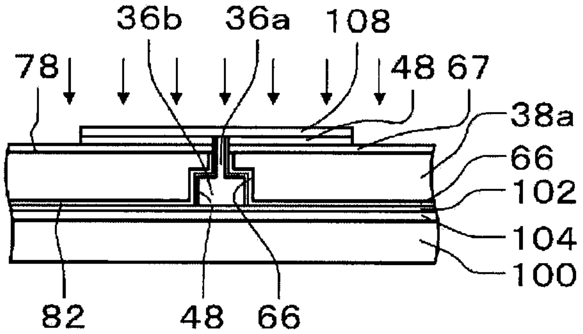

Next, as shown in FIG. 10B, the ink-repellent film 48 formed on the front surface of the ink discharge surface 78 is removed by Ar or $O_2$ plasma treatment.

Figure 10C:
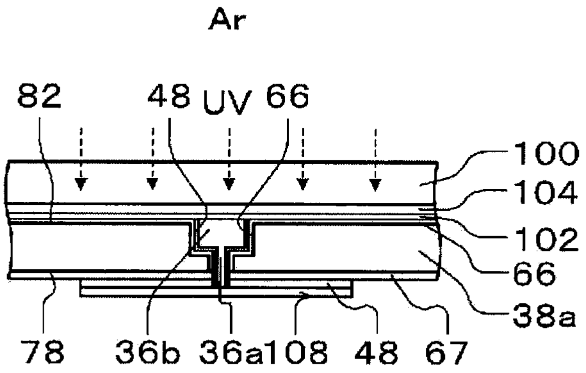
Figure 10D:
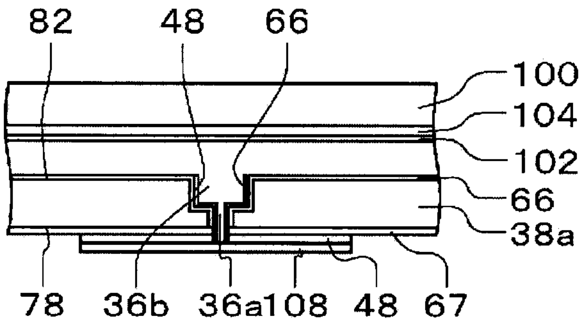

Then, as shown in FIG. 10C (which shows a state in which the nozzle plate main body 38*a* is turned upside down), UV rays are applied from the support substrate 100 side, whereby, as shown in FIG. 10D, the bonded surface 82 of the nozzle plate main body 38*a* is peeled off from the self-peeling layer 102 of the double-faced tape 104 on the support substrate 100.

Figure 11A:
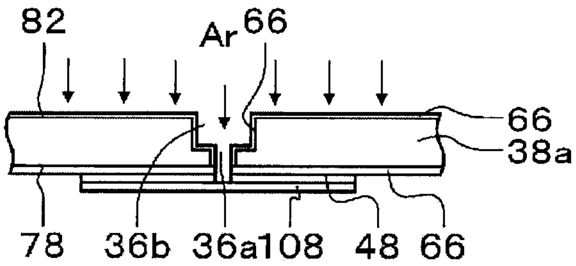
FIGS. 11A to 11C illustrate a process diagram showing the method for producing the nozzle substrate according to the embodiment.

Next, as shown in FIG. 11A, the extra ink-repellent film 48 formed on the front surface of the bonded surface 82 and the inner wall of the first nozzle hole 36*a* and the second nozzle hole 36*b* is removed by Ar or $O_2$ plasma treatment. Then, to enhance the adhesion strength of the nozzle substrate, after the substrate is immersed in a primer treatment liquid for 70 minutes, the substrate is rinsed with pure water and is then baked at 80° C. for 1 hour. At this time, primer treatment is performed on the bonded surface 82, the inner wall of a nozzle, and a part of the ink discharge surface 78, the part which is not masked with the protective film (the primer treatment layer is not shown).

At this time, as the primer treatment liquid, a silane coupler is used. Primer treatment was performed under the condition that the adjusted concentration of the primer treatment liquid was 0.2 vol % (adjustment was performed by dissolving a defined amount of a silane coupler in pure water).

Figure 11B:
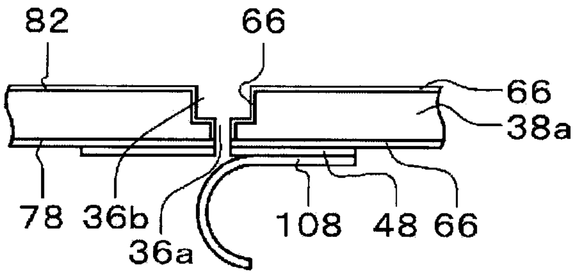
Figure 11C:
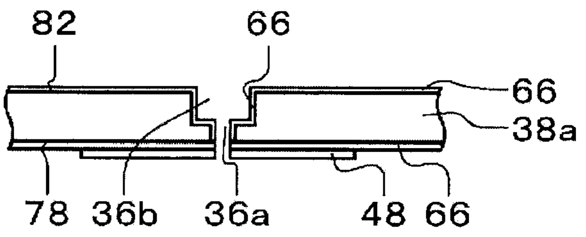

Next, as shown in FIG. 11B, the protective film 108 is peeled off from the nozzle plate main body 38*a*.

With the method described above, as shown in FIG. 11C, the nozzle substrate 38 having the ink discharge surface 78 with the periphery on which primer treatment is performed is formed.

Then, as shown in FIG. 2, a plurality of head main bodies 32 each having the nozzle substrate 38, the supply member 30, and the cover head 34 are assembled together, whereby the droplet discharge head 10 is fabricated.

In the embodiment described above, the electrostatically-driven ink-jet head and the method for producing the ink-jet head have been described; however, the invention is not limited to the embodiment described above. For example, the invention can also be applied to an ink-jet head which is driven by a drive system other than an electrostatic drive system. When a piezoelectric system is adopted, a piezoelectric element may be provided in place of the electrode substrate. Moreover, in addition to the ink-jet printer shown in FIG. 1, the ink-jet head 10 according to the embodiment described above can be applied to droplet discharge devices for various applications such as production of a color filter of a liquid crystal display, formation of a light-emitting portion of an organic EL display device, formation of a wiring portion of a wiring substrate produced by a printed circuit board production apparatus, and discharge of a biological liquid (production of a protein chip or DNA chip) by changing the material of the discharged liquid.

The entire disclosure of Japanese Patent Application No. 2009-279195, filed Dec. 9, 2009 is expressly incorporated by reference herein.

What is claimed is:

1. A method for producing a nozzle plate, comprising:

forming, on one surface of a work substrate, a first concave portion which becomes a discharge port and a second concave portion which becomes a feed port, the discharge port and the feed port of a nozzle for discharging a droplet;

bonding a support substrate to the one surface of the work substrate;

making the work substrate thinner from the other surface thereof so that the work substrate has a necessary thickness;

forming a water-repellent film on the other surface of the work substrate and in the first and second concave portions and then pasting an island-shaped tape on the other surface of the work substrate;

removing the water-repellent film on the periphery of the other surface of the work substrate;

peeling off the support substrate from the work substrate;

performing primer treatment (enhancing adhesion of an adhesive) on the periphery of the other surface of the work substrate; and peeling off the island-shaped tape.

2. The method for producing a nozzle plate according to claim 1, wherein when the work substrate is made thinner, the work substrate is polished by using a back grinder, a polisher, or a CMP apparatus.

3. The method for producing a nozzle plate according to claim 1, wherein as the support substrate, optically transparent material is used.

4. The method for producing a nozzle plate according to claim 1, wherein the first and second concave portions are formed by anisotropic dry etching performed by ICP discharge.

5. The method for producing a nozzle plate according to claim 1, wherein anisotropic dry etching is performed by using $C_4F_8$ and $SF_6$ as etching gas.

6. A method for producing a discharge head, wherein a discharge head is produced by using the method for producing a nozzle plate according to claim 1.

* * * * *